Jan. 30, 1962 F. E. VAN DUSEN 3,019,005
CONVEYING MEANS
Original Filed June 24, 1953 4 Sheets-Sheet 1

INVENTOR.
FREDERICK E. VAN DUSEN
BY
Moore, White & Burd
ATTORNEYS

Jan. 30, 1962  F. E. VAN DUSEN  3,019,005
CONVEYING MEANS

Original Filed June 24, 1953  4 Sheets-Sheet 2

INVENTOR.
FREDERICK E. VanDUSEN
BY
Moore, White & Beard
ATTORNEYS

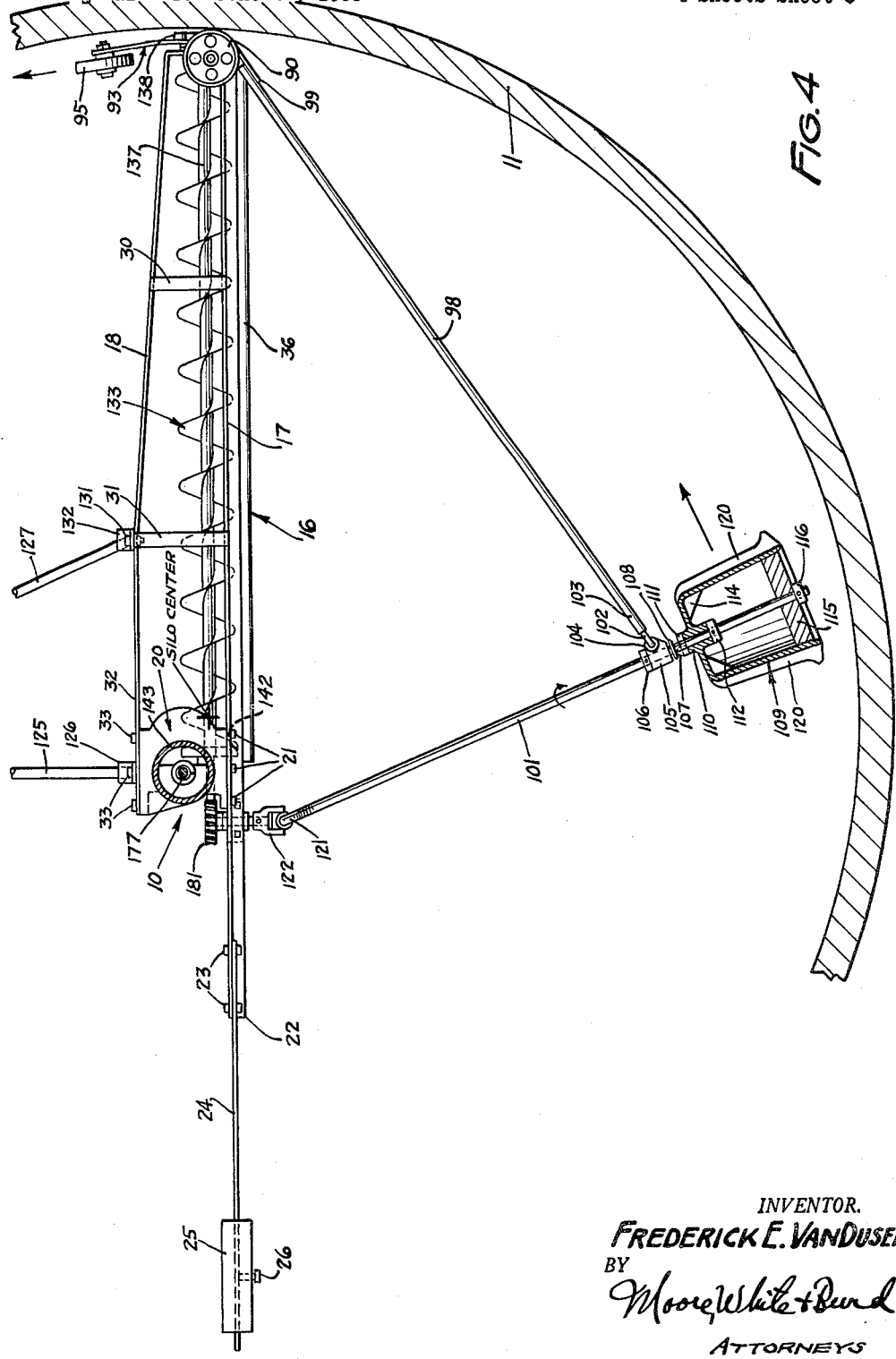

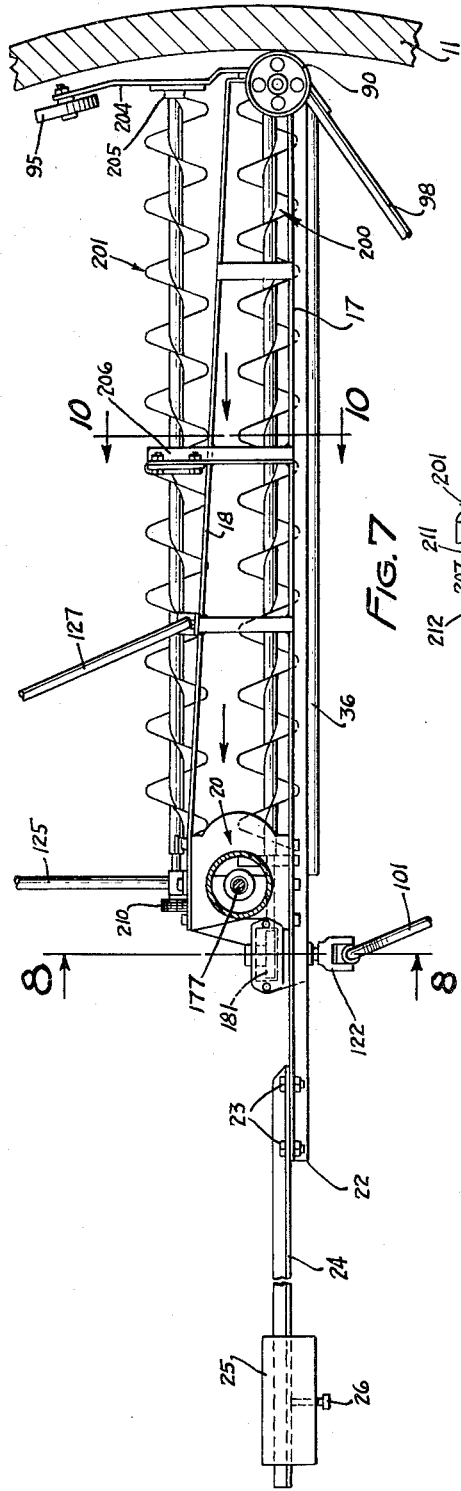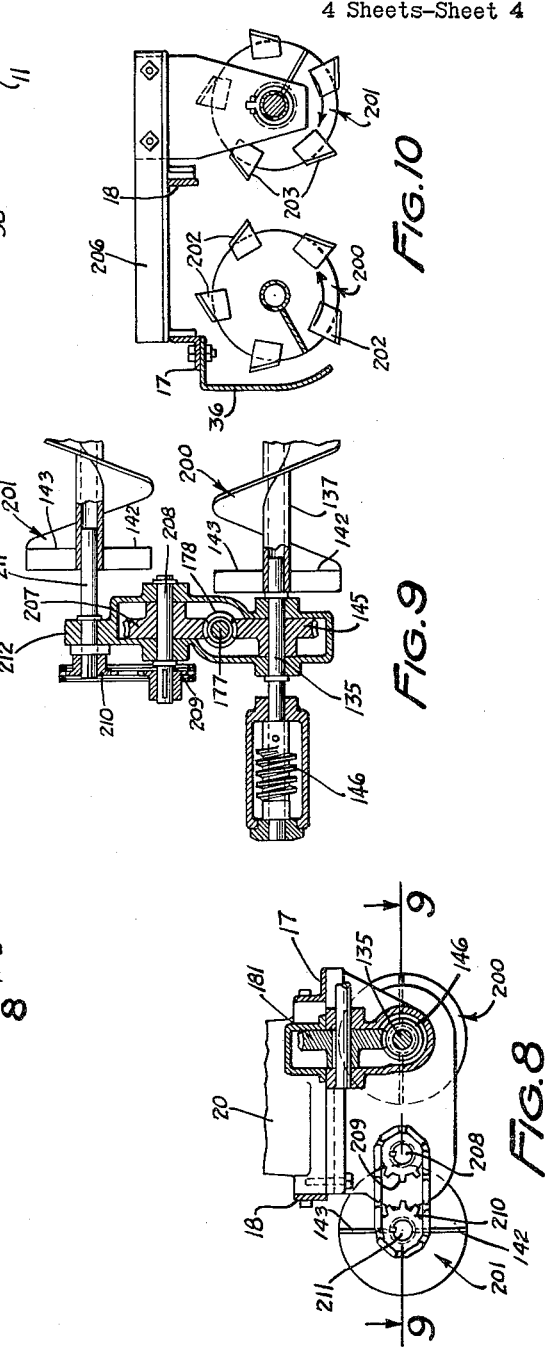

United States Patent Office 3,019,005
Patented Jan. 30, 1962

3,019,005
CONVEYING MEANS
Frederick E. Van Dusen, Wayzata, Minn., assignor, by mesne assignments, to Vandale Corporation, Long Lake, Minn., a corporation of Minnesota
Original application June 24, 1953, Ser. No. 363,750, now Patent No. 2,888,253, dated May 26, 1959. Divided and this application Jan. 8, 1959, Ser. No. 785,707
3 Claims. (Cl. 262—19)

This invention relates to new and useful improvements in chipping and conveying means for shredding and conveying materials and particularly helical conveyors for the shredding and conveying of corn or grass ensilage. This application is a division of my co-pending application Serial No. 363,750, filed June 24, 1953, now Patent No. 2,888,253, and a continuation-in-part of my application Serial No. 231,562, filed June 14, 1951, now Patent No. 2,719,058, for Silo Unloader.

It is an object of this invention to provide a helical auger means for shredding a surface layer of fibrous material and for the conveying of such layer.

It is another object of this invention to provide a new and useful spiral or helical conveyor.

Still another object of this invention is the provision of a helical conveyor having knife means affixed to the periphery of the flight thereof.

Still another object of the present invention is the provision of spaced knife segments positioned at intervals around the periphery of the flight of a helical conveyor.

A still further object of this invention is the provision of a helical conveyor having shredding means attached adjacent the periphery of the flight thereof and a second rotary shredding means positioned at the initial end of said helical conveyor.

Other and further objects of this invention reside in the provision of a paddle wheel cutting and shredding means positioned adjacent the initial end of a helical conveyor and rotatable in cooperation therewith and in the specific constructional details of said paddle wheel shredding means and the constructional details of the conveyor flight and the knife means positioned adjacent the periphery thereof.

Other objects of the invention are those apparent and inherent in the apparatus as described, pictured and claimed.

This invention will be described with reference to the drawings in which corresponding numerals refer to the same parts and in which:

FIGURE 4 is an enlarged fragmentary horizontal sectional view of a portion of a silo and of the unloader of FIGURE 1 and showing the plan view of the helical conveying means;

FIGURE 7 is a top plan view, partially in section, showing a modified form of the helical conveying means of the instant invention;

FIGURE 8 is a view taken along the line and in the direction of the arrows 8—8 of FIGURE 7;

FIGURE 9 is a view taken along the line and in the direction of the arrows 9—9 of FIGURE 8; and FIGURE 10 is a view taken along the line and in the direction of the arrows 10—10 of FIGURE 7.

Figure 1:
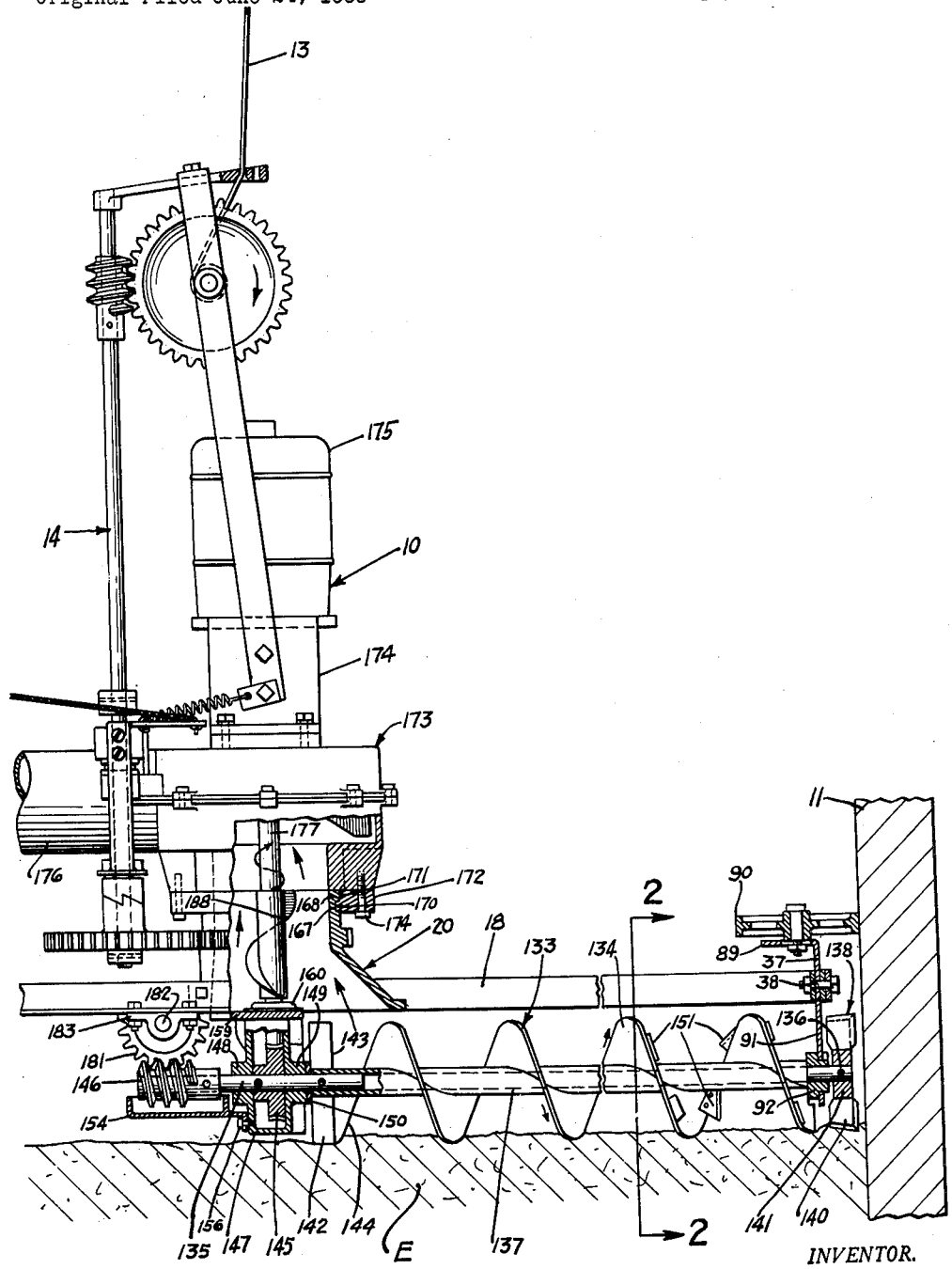
FIGURE 1 is an enlarged fragmentary elevational view, partially in section, of a silo unloader embodying the helical conveying means of the instant invention.

Referring now to the drawings, and particularly to FIGURE 1, there is shown a silo unloader generally designated 10, which is adapted to be positioned in a silo 11 having a vertical cylindrical wall. At this point, it may be noted, that my invention will be explained with reference to a silo unloader and will be illustrated as embodied in a silo having a cylindrical vertical wall. In this embodiment the helical conveying means is rotated about the center of the silo. However, it is to be understood that my improvement in helical conveying means possesses utility apart from this embodiment in a silo unloader and may be placed on wheels for propulsion or may be used together with other structure as desired, all within the spirit and scope of this invention.

The unloader 10 is supported from a cable 13 having one end attached to a suitable support at the upper end of the silo and the other end attached to a means for gradually lowering the unloader in the silo generally designated 14.

Figure 5:
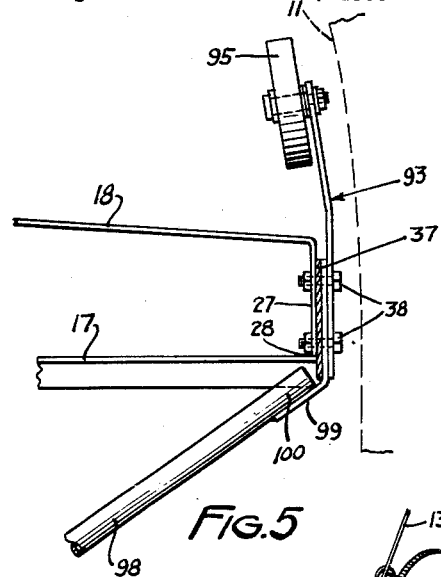
FIGURE 5 is a horizontal sectional view taken along the line and in the direction of the arrows 5—5 of FIGURE 2.

Referring now to FIGURE 4, the helical conveyor assembly generally designated 16 operates as a radial gathering arm comprising a frame having an angle member 17 as shown best in FIGURE 5 and a strap member 18. Angle member 17 is joined to intake hub generally designated 20 by means of bolts 21 as best seen with reference to FIGURE 4, and extends a short distance to the left thereof, as is seen best with reference to FIGURE 4, showing the angle member 17 terminated at 22. Attached to the end 22 by bolts 23 is an extending rod 24, upon which counterweight 25, having a set screw 26, is adapted to slide. Thus, the counterweight may be slid toward and away from the intake hub on rod 24 and will provide an adjustable counterweight or counterbalance for the helical conveyor or auger assembly 16, as is well known. The other end of the angle member 17 is welded or otherwise secured to end 27 of strap member 18 at 28, end 27 being bent at right angles to strap member 18, all as shown best with reference to FIGURE 5. As may be seen best with reference to FIGURE 4, the member 18 takes the configuration shown therein and is additionally connected to the angle member 17 by braces 30 and 31, which serve to connect members 17 and 18 at points approximately ⅓ of the way inward from each end. End 32 of member 18 is also connected to the intake hub 20 by bolts 33. As is shown by FIGURE 4, the angle member 17 of the auger or helical drive assembly 16 and the strap member 18 of the auger assembly 16 are connected respectively to opposite sides of intake hub 20.

Figure 2:
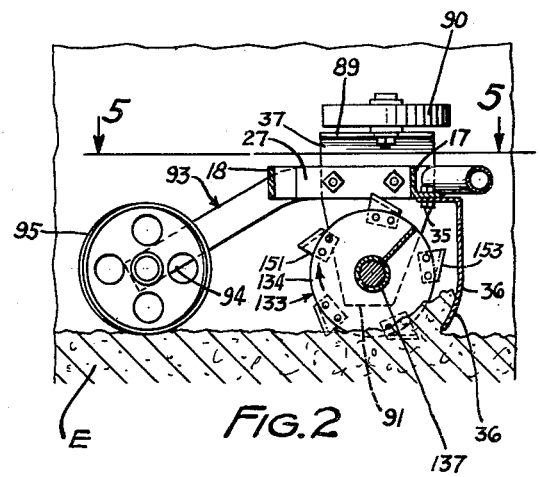
FIGURE 2 is a vertical sectional view taken along the line and in the direction of the arrows 2—2 of FIGURE 1.

Connected to the horizontal flange of angle member 17 by bolts 35, one of which is shown in FIGURE 2, is an auger shield 36 of the configuration shown in FIGURE 2 and which extends longitudinally along the entire length of the auger as may be seen with reference to FIGURE 4. Disposed on the outer or rightward end of the auger assembly with reference to FIGURES 1 and 2 is an outer bearing support 37. This support is of the configuration best shown in FIGURE 2 and is bolted to end 27 by means of bolts 38. It is provided with an inwardly extending horizontal flange 89. Flange 89 is apertured at the center thereof and guide wheel 90 is journalled on a vertical axis for rotation thereover. Wheel 90 is positioned so as to contact the wall 11 of the silo and to roll thereon and guide the auger assembly therearound as is shown best with reference to FIGURES 1 and 4. At the same time, the force of the wheel 90 pushes the entire mechanism 10 a little off-center, as shown best in FIGURE 4. An aperture is provided in depending portion 91 of the outer bearing support 37 in which is inserted a bearing block 92. This bearing block may be attached thereto in any suitable manner. Also attached to end 27 by bolts 38 is an advance wheel support bracket 93. Bracket 93 has a forwardly and downwardly extending end 94 on which is journalled advance wheel 95 for rotation about a horizontal axis. Advance wheel 95, as illustrated in FIGURE 2, is adapted for rolling on the surface of the ensilage E of the silo and hence serves partially to support the auger assembly thereon and guide the same thereover, as the assembly is rotated in the direction of the arrow of FIGURE 4.

A pusher brace 98 has a strap 99 welded or otherwise secured to end 100 and is maintained in position with reference to end 27 by bolts 38 passing through apertures therein as is shown best with reference to FIGURE 5. Thus, FIGURE 5 shows end 27, outer bearing support 37 positioned adjacent thereto and strap 99 positioned between outer bearing support 37 and advance wheel bracket 93. Bracket 93, strap 99, support 37 and end 27 of strap 18 are all apertured for the passage therethrough of bolts 38.

Tubular pusher brace 98 has a hook 102 welded or otherwise secured in end 103 thereof as is shown best with reference to FIGURE 4. Hook 102 is of standard construction and is provided with an aperture at the terminating end, not shown, through which is adapted to be inserted a cotter key, also not shown. Hook 102 is passed through an aperture in protruding ear 104 of drive hub shaft bearing 105. Bearing 105 has a bearing surface not shown in which drive hub shaft 101 is journalled for rotation. A collar 106 is provided on drive hub shaft 101 which prevents any inward radial movement of bearing 105 thereon. Key 107 is welded into a slot or otherwise secured to drive hub shaft 101 and spaced apart from collar 106 as shown best with reference to FIGURE 4. Washer 108 is retained in the drive hub shaft 101 by the key 107 and thus collar 106 and washer 108 serve as limit surfaces for the inward and outward radial movement of bearing 105.

The drive hub 109 has a central boss 110 which is provided with a transverse keyway 111 which is adapted for cooperation with key 107 whereby the hub will be keyed to the shaft so that the rotation of the shaft will rotate the drive hub. Boss 110 is maintained in position so that way 111 maintains cooperation with key 107 by the action of collar 112 which is in turn maintained in position on shaft 101 by means of a set screw. Drive hub 109 is of a configuration shown best with reference to FIGURE 4, and is provided with a plurality of extending ribs 120. The drive hub is usually cast of hollow construction and provided with the bell-shaped ribs 120. If desired, inner strengthening webs 114 may be cast integrally with the drive hub. The plug weight 115 having a center aperture therein is forced into the end of the drive hub and hence frictionally maintained in position as is shown in FIGURE 4. A collar 116 is disposed on the outward end of shaft 101, and serves to provide additional security for the plug 115. The plug weight 115 serves to cause an additional traction upon the drive hub 109 and hence aids the ribs 120 in gripping the top surface of the ensilage E as the hub drives the apparatus in the direction shown by the arrow in FIGURE 4. Shaft 101, as may be seen best with reference to FIGURE 4, is provided with a hook 121 at the inner end thereof. Hook 121 is inserted through universal joint 122 and maintained thereon by the use of a cotter key and washer assembly similar to that described for hook 102, as is well known.

A guide rod 125 is provided having upon one end a wheel adapted to engage the wall 11 of the silo as explained more fully in my co-pending application and having at the other end an angle flange 126, which is welded or otherwise secured thereto. Flange 126 is secured to intake hub 20 by the center one of the bolts 33 which also serves to secure strap 32 thereto as shown in FIGURE 4. A brace 127 is shown in fragmentary form in FIGURE 4 and is connected to rod 125 adjacent the caster wheel provided on its outward end and is connected at the other end with an angle flange 132 welded or otherwise secured thereto and which is in turn secured to strap 18 at its juncture with brace 31 by a bolt 131 all as shown in FIGURE 4.

Figure 3:
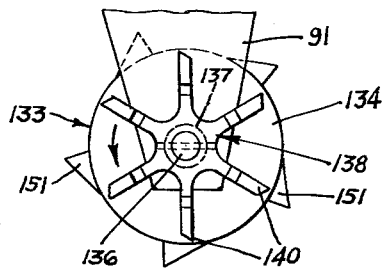
FIGURE 3 is an end elevation of the helical conveying means and showing the wall cleaning means attached thereto.

As may be seen best with reference to FIGURE 1, the auger generally designated 133 comprises an auger spiral or flight 134, and a hollow shaft 137 having rods 135 and 136 welded or pinned to the interior thereof. Rod 136 is seated in bearing block 92 and at the exterior end thereof and is provided with a wall cleaner 138 which is provided with a plurality of knives 140, in this particular instance being six in number, situated on the wall cutter hub 141, all as shown best in FIGURES 1 and 3. The knives 140 are shown as being inclined downwardly and inwardly from the wall 11 or leftwardly with reference to FIGURE 7, but it is to be understood that these knives may be of other incline or edge configuration without departing from the spirit and scope of this invention.

Secured to the spiral 134 at the inner end thereof is a paddle comprised of two paddle arms 142 and 143. Arms 142 and 143 are rectangular and strap-like in nature, as may be seen with reference to FIGURE 1, and extend outwardly from the shaft 137, in opposite directions, paddle 142 being secured to the terminal end 144 of spiral 134. The paddle arms help to toss the ensilage that is gathered toward the center of the silo by auger 133 in the direction of the arrows in FIGURE 1. Secured to the auger shaft 135 by a pin or set screw is auger drive gear 145. Also secured to the rod 135 at the end thereof is a worm 146 pinned or keyed thereto. An auger drive gear housing 147 provides oppositely disposed bearing bosses 148 and 149 in which rod 135 is seated for rotation. A washer 150 is disposed between the flight 134 and boss 149, and gear 145 is disposed within the interior of the housing 147, the interior edges of bosses 148 and 149 limiting its axial movement, and worm 146, as mentioned previously, is disposed on end of shaft 135 and externally to the housing 147.

The spiral auger 134 is provided with a plurality of cutting knives 151 at the outer edges thereof. Thus, in FIGURE 1, there is shown a plurality of knives 151 riveted to the periphery of spiral 134, the knives being provided with an edge 153 inclined outwardly with reference to a direction opposite the direction of rotation as shown by the arrow in FIGURE 2. Cutters 151 loosen frozen ensilage and grass ensilage and are extremely efficient in chopping up the ensilage.

Underneath the worm 146 a drip pan 154 is provided to retain any grease from worm 146 and to prevent ensilage from being entangled therewith. Pan 154 is secured to housing 147 by bolts 156, one of which is shown in FIGURE 1. Housing 147 is secured to the intake hub 20 by means of bolts, not shown. A filler plate 159 is sandwiched between housing 147 and intake hub 20. Filler plate 159 is provided with a bearing 160 at the center thereof, bearing 160 being supported by plate 159. Plate 159 is maintained in the sandwiched position between intake hub 20 and housing 147 by a plurality of bolts, some passing upwardly from housing 147, and some passing downwardly from hub 20, not shown. These bolts may be provided in any suitable place and in sufficient number to maintain housing 147, filler plate 159 and intake hub 20 readily in contact with one another, the surfaces of these elements being machined wherever they meet.

The circular exterior portion of hub 20 is machined at the top thereof to provide a recessed portion 167 and a cylindrical lip 168. Recess 167 and lip 168 are adapted for cooperation with a corresponding lip 170 and recess 171 which are provided on split collar 172. Respective lips and recesses of collar 172 and hub 20 are machined so as to provide a bearing assembly for the rotation of hub 20 in collar 172. Collar 172 is firmly secured to blower housing 173 by a plurality of bolts 174 secured around the periphery thereof.

Blower housing 173 is provided with a pedestal 174 on which sets motor 175. It is also provided with a discharge spout 176. Motor 175 is provided with a shaft which is connected to a central shaft 177 which rotates an impeller 188 and also rotates worm gear 178 (shown best in FIGURE 6) for the rotation of auger drive gear 145 and hence for the rotation of the auger 134. Worm gear 178 is keyed to the shaft 177 or is affixed thereto by other suitable means.

Figure 6:
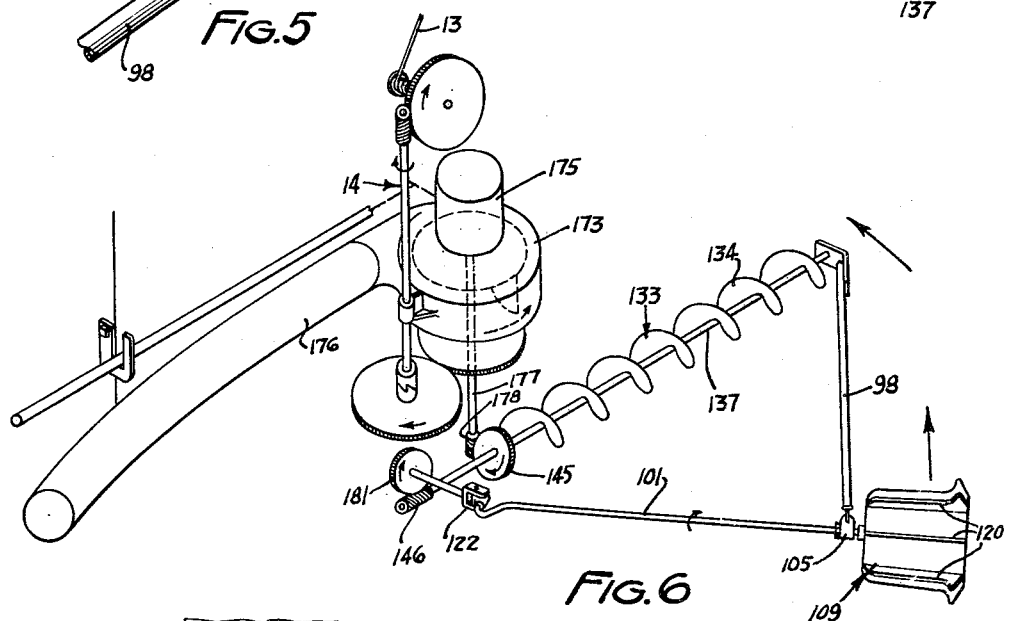
FIGURE 6 is an isometric diagrammatic view of the silo unloader showing the drive means for a helical conveying means.

With respect particularly to FIGURES 1 and 6, it may be seen that as the shaft 177 is driven by the motor 175, the worm 178 serves to drive auger drive gear 145 which is turn drives worm 146, which by engagement with gear 181 which in turn rotates universal 122 will cause the rotation of the drive hub 109. Shaft 182 is supported in a pillow block 183 which is bolted to the underside of angle member 17 as may best be seen with reference to FIGURE 1. The impeller 188 is mounted on shaft 177 and the spiral flight thereof carries ensilage upwardly as shown by the arrows in FIGURE 1.

Referring now particularly to FIGURES 7–10, there is shown the modification of my helical conveying means in which two augers are provided for rotation in a direction opposite to one another so as to feed ensilage in an inward direction therebetween. Thus, with reference to FIGURE 7, it may be seen that there is provided feed augers 200 and 201. Feed auger 200 is constructed exactly the same as auger 133, feed auger 201 is constructed similarly thereto except that the spiral runs in the reverse direction as may be seen with reference to FIGURE 7. Both of these augers are provided with cutting knives or teeth 202 and 203 similar to teeth 151. Thus, knives 202 are identical with knives 151 and knives 203 are likewise identical except that they are positioned reversely in accordance with the reverse positioning of auger 201 with reference thereto. Both of these augers are also provided with paddle arms 142 and 143 as explained with reference to the modification of FIGURES 1–6.

Thus, when auger 201 rotates in the direction of the arrow in FIGURE 10, and when auger 200 rotates in the direction of the arrow shown in FIGURE 10 ensilage will be fed from the right to the left in FIGURE 7 therebetween. In this modified form the advance wheel support bracket is designated 204 and is similar to advance wheel support bracket 93 except that it is elongated and provided with an inward end so as to provide a support for bearing block 205. A supporting angle 206 is welded to angle member 17 and strap member 18 and projects over strap member 18 as may be seen with reference to FIGURE 7. Also, in this modified form, as may be seen with reference to FIGURE 7, it is necessary to weld or otherwise secure the rod 127 in position on strap member slightly higher than that shown in FIGURE 4 so that clearance is obtained for the rotation of auger 201. It may be stated at this time that central bearings may be provided as at angle 206 for the augers 200 and 201 if desired and an additional wall wheel or cleaner similar to wheel 90 may be provided for auger 201, all within the spirit and scope of this invention.

It may be seen with reference to FIGURES 8 and 9 that the housing in the modified form (similar to housing 147) has been enlarged so as to provide a housing which covers not only the gear 145 for auger 133 (in the modified form, auger 200) but so as to enclose gear 207 which is oppositely disposed to gear 145 and operated by worm 178. Gear 207 is fixedly attached to shaft 208 as is sprocket 209 which is keyed thereto. A similar sprocket 210 is attached to the end of shaft 211 of auger 201 as shown in FIGURE 9. In this modified form, the pillow block 212 is shown encompassed in the housing.

In the operation of the modified form, shown in FIGURES 7–10, the augers rotate toward one another as shown by the arrows in FIGURE 10 and gather the ensilage to force it in from a direction from right to left as shown in FIGURE 7 and thence into the intake in a manner similar to that described for the operation of the form shown in FIGURES 1–6. Referring now particularly to FIGURES 1–6, it may be seen that the counterweight 25 may be slid backwardly and forwardly on bar 24 to counterbalance the weight of the auger assembly 16. As may be seen best with reference to FIGURE 6, the rotation of the drive shaft 177 of the motor rotates the worm 178. Rotation of the worm gear 178 causes the rotation of the auger 133, or as in the case of the modified form shown in FIGURES 7–10, the rotation of augers 200 and 201. Rotation of the auger 133 causes also the rotation of worm 146 which rotates worm gear 181 and through the universal coupling 122 the drive hub 109 in the direction shown by the arrow in FIGURE 4.

As the drive hub 109 rotates in the direction shown by the arrows on the shaft thereof, it will walk around and around in a direction counterclockwise with reference to FIGURE 4. Advance wheel 95 will roll on the surface of the ensilage as may be seen with reference to FIGURE 2 and wheel 90 will roll on the inner surface of the silo wall as shown in FIGURE 4. As wheel 90 and wheel 95 engage the inner surface of the silo wall and the surface of the ensilage respectively and hub 109 causes rotation of the auger, the whole silo unloader will shift its axial position with reference to the silo center since it is positioned eccentrically with respect thereto as may be seen with reference to FIGURE 4, wherein it may be noted that auger 133 is of an extension that is greater than the radius dimension of the silo. Consequently, as the auger is rotated in the silo the axial center of ensilage in the silo is always engaged by the auger spiral 134 and consequently no amount of undelivered ensilage will be left in the center thereof as the unloader operates. The teeth or cutters 151 on the outer edge of the spiral serve to cut, chip or shred any ensilage which may be frozen and to provide a start for the engagement of the auger flight with the ensilage E. The wall cleaner 138 is provided with blades 140 as may be best seen with reference to FIGURE 1 which serve to insure that no ledge of ensilage is retained in position next to the wall 11.

As many apparently widely differing embodiments of this invention may be made without departing from the spirit and scope thereof, it is to be understood that I do not limit myself to the specific embodiments disclosed herein.

What is claimed is:

1. In a silo unloader or the like, an elongated conveying means adapted to be positioned upon the surface of ensilage within a silo for conveying ensilage substantially radially of the silo, said conveying means having an outer end adapted to be positioned adjacent the wall of the silo and an inner end adapted to be positioned substantially centrally of the silo, means for rotating said conveying means about a vertical axis positioned substantially at its inner end, said conveying means including a spiral flight, knife means secured to portions of the periphery of said spiral flight in spaced relation, at one side thereof and extending therebeyond and said knife means being generally inclined in a direction opposite to the direction of rotation of the spiral flight so that the cutting edge thereof intersects said spiral flight at its leading end and is in spaced relation thereto at its trailing end.

2. In a silo unloader or the like, an elongated conveying means adapted to be positioned upon the surface of ensilage within a silo for conveying ensilage substantially radially of the silo, said conveying means having an outer end adapted to be positioned adjacent the wall of the silo and an inner end adapted to be positioned substantially centrally of the silo, means for rotating said conveying means about a vertical axis positioned substantially at its inner end, said conveying means including a spiral flight, and substantially flat knife blade members secured to said spiral flight at intervals along its periphery, said substantially flat knife blade members having linearly extending sharpened edges which extend substantially parallel to the portion of said spiral flight to which said substantially flat knife blade members are secured and extending both radially and axially with respect to the center axis of said spiral flight.

3. The conveyor of claim 2 in which the linearly extending sharpened edges of said flat knife blade members are inclined against the direction of rotation of said spiral flight wherein the leading edge of said linearly extending blade intersects the periphery of said spiral flight and the trailing edge is spaced therefrom.

References Cited in the file of this patent

UNITED STATES PATENTS

| | | |
|---|---|---|
| 1,336,440 | O'Toole | Apr. 13, 1920 |
| 1,570,085 | Saxe | Jan. 19, 1926 |
| 1,867,245 | Bailey | July 12, 1932 |
| 2,651,438 | Peterson | Sept. 8, 1953 |
| 2,677,474 | Long | May 4, 1954 |